United States Patent

US011529953B2

(12) United States Patent
Rollinger et al.

(10) Patent No.: US 11,529,953 B2
(45) Date of Patent: Dec. 20, 2022

(54) ADJUST OPERATIONAL PARAMETERS BASED ON IDENTIFIED ROADWAY IRREGULARITIES

(71) Applicant: Ford Global Technologies, LLC, Dearborn, MI (US)

(72) Inventors: John Eric Rollinger, Troy, MI (US); Tyler Kelly, Plymouth, MI (US); Scott S. Thompson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 16/863,198

(22) Filed: Apr. 30, 2020

(65) Prior Publication Data

US 2021/0339744 A1    Nov. 4, 2021

(51) Int. Cl.
*B60W 30/14*     (2006.01)
*B60W 40/09*     (2012.01)

(52) U.S. Cl.
CPC .......... *B60W 30/143* (2013.01); *B60W 40/09* (2013.01); *B60W 2530/18* (2013.01)

(58) Field of Classification Search
CPC . B60W 30/143; B60W 40/09; B60W 2530/18
See application file for complete search history.

(56) References Cited

U.S. PATENT DOCUMENTS

| | | | |
|---|---|---|---|
| 6,999,859 B2 | 2/2006 | Kin | |
| 2009/0164060 A1 | 6/2009 | Fortson et al. | |
| 2010/0308988 A1* | 12/2010 | Ieda | B60Q 1/40 340/477 |
| 2012/0265402 A1 | 10/2012 | Post, II et al. | |
| 2014/0297116 A1 | 10/2014 | Anderson et al. | |
| 2015/0073674 A1 | 3/2015 | Kelly et al. | |
| 2021/0008933 A1* | 1/2021 | Kretschmann | B60C 23/0408 |

FOREIGN PATENT DOCUMENTS

| | | | | |
|---|---|---|---|---|
| CN | 108445250 A | * | 8/2018 | |
| DE | 102013208190 A1 | * | 11/2014 | ........... B60C 11/246 |
| EP | 1522861 A1 | * | 4/2005 | ............. G01P 3/803 |
| JP | 2004142550 A | | 5/2004 | |

OTHER PUBLICATIONS

Machine translation of CN-108445250-A (Year: 2018).*
Machine translation of DE-102013208190-A1 (Year: 2014).*
Machine translation of EP-1522861-A1 (Year: 2005).*
Han, H. et al., "SenSpeed: Sensing Driving Conditions to Estimate Vehicle Speed in Urban Environments," Proceedings of the 2014 IEEE INFOCON—IEEE Conference on Computer Connections, Apr. 27, 2014, Toronto, Canada, 9 pages.

* cited by examiner

*Primary Examiner* — Jeff A Burke
*Assistant Examiner* — Mohamad O El Sayah
(74) *Attorney, Agent, or Firm* — Vincent Mastrogiacomo; McCoy Russell LLP (57) ABSTRACT

Methods and systems are provided for improving vehicle speed measurements. A vehicle may detect the impact of a roadway irregularity to its front wheels and its rear wheels, and may calculate an instantaneous vehicle speed on the basis of its wheelbase and an elapsed time between the two impacts. This instantaneous vehicle speed may then be used to calculate one or more correction factors which may be used to correct a conventionally-acquired vehicle speed measurement, an operational parameter of the vehicle underlying such measurements (such as a wheel size or a final drive ratio), or both.

12 Claims, 8 Drawing Sheets

ADJUST OPERATIONAL PARAMETERS BASED ON IDENTIFIED ROADWAY IRREGULARITIES

FIELD

The present description relates generally to methods and systems for accounting for changes in operational parameters of vehicles.

BACKGROUND/SUMMARY

Measurements of vehicle speed may assist drivers (and mechanisms providing automated cruise control) to evaluate the speed of a vehicle, which may in turn facilitate prudent driving, as well as adherence to various related laws and rules. Vehicle speed may be determined by measuring other parameters of the vehicle, which may be related to vehicle speed, and using the related parameter to derive a vehicle-speed measurement. For example, a wheel size or a final-drive ratio may be used along with a number of revolutions per minute to derive a vehicle-speed measurement.

However, vehicles may sometimes be modified in ways that affect their operational parameters. Changes to tires may change a wheel size (such as by changing the size of a vehicle's tires themselves, or possibly by changing their air pressures). Similarly, changes to a final drive ratio may change the relationship between the number of revolutions of a vehicle's engine and the number of revolutions of the vehicle's wheels. Moreover, various parameters may be less accurate than possible due to general tolerances regarding the measurement of operational parameters (such as wheel speed sensors or output shaft speed sensors). These factors may result in inaccurate vehicle speed measurement, which may then be reported to a driver as well as to various electronic controllers in the vehicle that may use such information.

By detecting roadway irregularities (e.g., bumps) with front wheels and rear wheels (or front suspensions and rear suspensions), it may be possible to provide the technical result of correcting subsequent vehicle speed measurements, or correcting underlying operational parameters, or both. For example, detecting an impact to the front wheels of a vehicle due to a bump or other roadway irregularity, then detecting a subsequent impact to the rear wheels of a vehicle, and establishing an elapsed duration between the two impacts may allow for the calculation of an instantaneous vehicle speed on the basis of a vehicle's wheelbase and the elapsed duration. Such a calculated instantaneous vehicle speed may then be used to establish a correction factor to be used to correct subsequent vehicle-speed measurements.

Various mechanisms and methods disclosed herein have been developed in recognition of the above-mentioned issues. These mechanisms and methods may: detect when front wheels or a front suspension of a vehicle impact a roadway irregularity (e.g., a bump); detect when rear wheels or a rear suspension of the vehicle impact the roadway irregularity; identify the incidence of a roadway irregularity based on the two impacts; determine an elapsed time between the two impacts; and calculate an instantaneous vehicle speed on the basis of a wheelbase of the vehicle and the elapsed time. The mechanisms and methods may then calculate a correction factor based upon the instantaneous vehicle speed measurement and a conventionally-acquired vehicle speed measurements, and may correct subsequent conventionally-acquired vehicle speed measurements based on the correction factor. The mechanisms and methods disclosed herein may thereby advantageously permit more accurate measurements of vehicle speed, for use by vehicle operators and/or automated vehicle controllers (e.g., cruise control systems).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for calculating instantaneous vehicle speeds based on traversed roadway irregularities and correcting vehicle-speed measurements of a vehicle propulsion system. As depicted and discussed with respect to FIGS. 1A and 2, a vehicle may pass over and identify a roadway irregularity (e.g., a bump). As depicted and discussed with respect to FIGS. 1A through 4, the vehicle may calculate an instantaneous vehicle speed on the basis of impacts related to the irregularity and may use that instantaneous vehicle speed to correct an operational parameter of the vehicle (such as a wheel size or a final drive ratio) and/or may correct subsequent conventionally-acquired vehicle speed measurements. A variety of vehicle configurations may employ these mechanisms and methods, as depicted and discussed with respect to FIGS. 2 and 5.

Figure 1A:
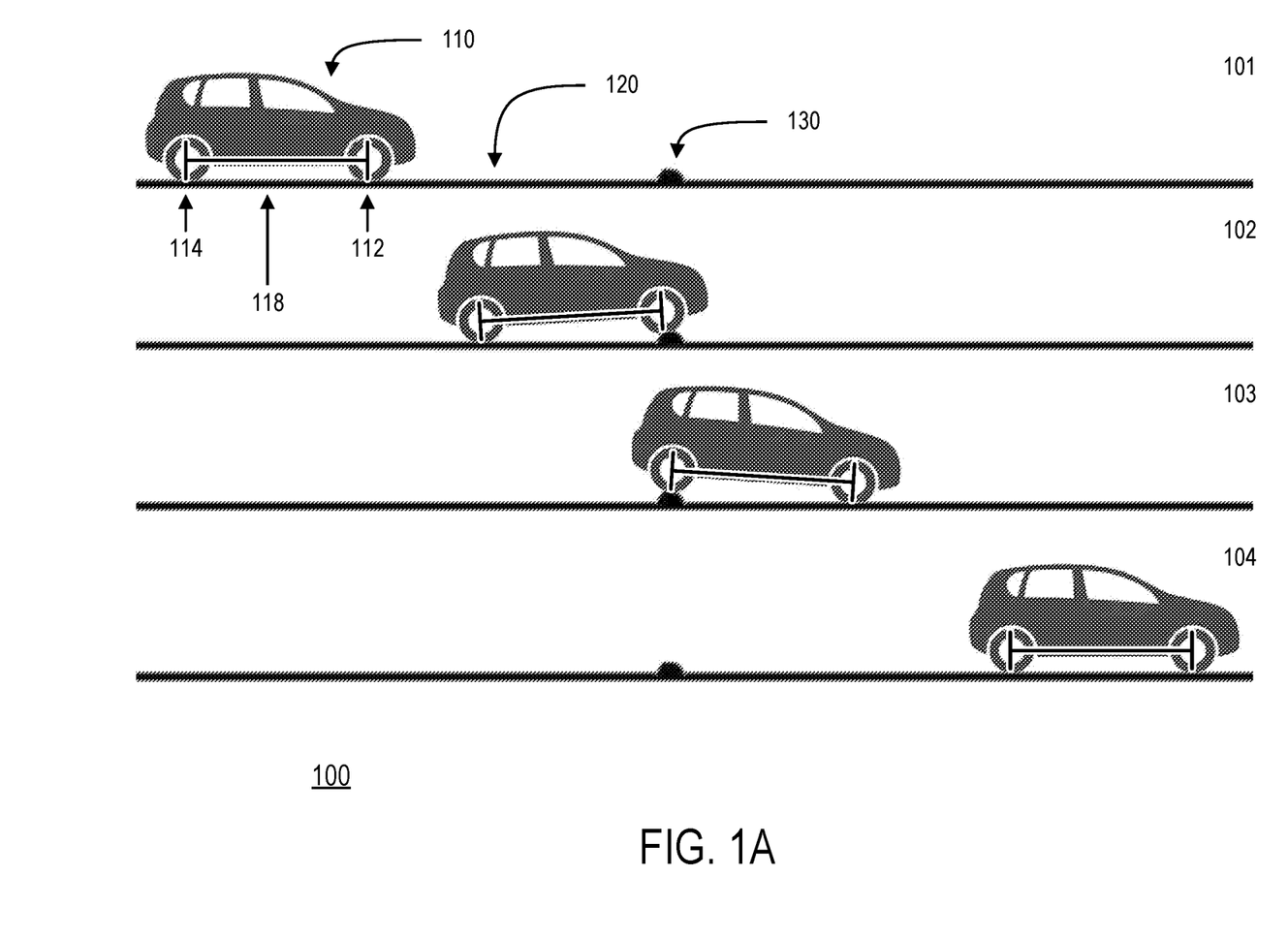
FIG. 1A shows a scenario of a vehicle passing over a roadway irregularity.

FIG. 1A shows a scenario 100 in which a vehicle 110 is passing over a roadway 120 with a roadway irregularity 130. Vehicle 110 may comprise one or more front wheels 112 and one or more rear wheels 114. A wheelbase 118 may be a distance between the centers of front wheels 112 and rear wheels 114 (e.g., at a neutral steering position of vehicle 100 in which the wheelbase is the same on the left side and right side).

Irregularity 130 is depicted as a protrusion extending upward. However, in various embodiments, irregularity 130 may be an indentation extending downward. Moreover, irregularity 130 might be an engineered feature of the roadway (such as a speed bump), or a non-engineered feature of the roadway (such as a pothole, or a rock or other debris). In various embodiments, irregularity 130 may be a bump of any sort that results in an impact to the wheels of vehicle 110. Since vehicle 110 may encounter and pass over a wide variety of irregularities and bumps in the course of typical use, vehicle 110 may have many opportunities to benefit from the advantageous mechanisms and methods disclosed herein.

At a first time 101, vehicle 110 has not yet arrived at irregularity 130, while at a second time 102, front wheels 112 of vehicle 110 are passing over irregularity 130. Front wheels 112 of vehicle 110 may experience an impact as they reach and strike irregularity 130, which vehicle 110 may detect as discussed herein. Afterward, at a third time 103, rear wheels 114 of vehicle 110 are passing over irregularity 130, which vehicle 110 may detect as well. At a fourth time 104, vehicle 110 has completed passing over irregularity 130.

In scenario 100, vehicle 110 is passing over roadway 120 at a substantially constant speed. Vehicle 110 may be travelling at a relatively lower vehicle speed, such as a speed below approximately 25 mph. For impact detection algorithms operating at a sampling rate of approximately 10 milliseconds (ms), data gathered with respect to impacts at relatively lower vehicle speeds may advantageously be very accurate in comparison with data gathered by, for example, wheel speed sensors, or driveshaft sensors. In some embodiments, data gathered as disclosed herein may be 2 to 10 times more accurate. As a result, such gathered data may advantageously be independent of some of the largest "noise" factors that may cause inaccuracies in vehicle speed sensing (such as wheel size or tire size, and/or final drive ratio).

Vehicle 110 may detect the impact of irregularity 130 in various ways. In some embodiments, vehicle 110 may detect a first impact to a front suspension of vehicle 110 associated with front wheels 112 and/or may detect a second impact to a rear suspension of vehicle 110 associated with rear wheels 114. For some embodiments, vehicle 110 may detect separate impacts to the left wheel and right wheel of front wheels 112, and/or may detect separate impacts to the left wheel and right wheel of rear wheels 114. Vehicle 110 may then identify that it has experienced a bump by having detected the first impact and the subsequent second impact.

In some embodiments, vehicle 110 may use one or more accelerometers to detect an impact. For example, in some embodiments, vehicle 110 may use vertical accelerometer mounted to, connected to, or otherwise coupled to either the front suspension of vehicle 110 or the rear suspension of vehicle 110. For some embodiments, vehicle 110 may use vertical accelerometers mounted to, connected to, or otherwise coupled to one or more of front wheels 112 and/or rear wheels 114. In some embodiments, vertical-accelerometer data (e.g., variation of road-surface height of roadway 120, in a Z-direction normal to horizontal plane of vehicle 110) may be acquired by processing data from one or more longitudinal accelerometers and one or more lateral accelerometers, calculating average pitch and average roll associated with roadway 120, removing the average pitch and roll from the data, removing transient longitudinal acceleration and lateral acceleration from motive force changes, and removing steering from the data.

In various embodiments, having identified that it has experienced a bump, vehicle 110 may derive an instantaneous vehicle speed based on wheelbase 118 (or another operational parameter of the vehicle). Vehicle 110 may derive this instantaneous vehicle speed by dividing the wheelbase 118 by the amount of time taken for vehicle 110 to pass over that length—e.g., the amount of time between the first impact and the second impact.

In some embodiments, vehicle 110 may have a timer, which it may initialize upon starting. When vehicle 110 detects the first impact, it may start the timer, and when vehicle 110 detects the second impact, it may stop the timer. For some embodiments, vehicle 110 may count a number of samples (taken at a sampling rate of its impact detection algorithm) between the first impact and the second impact.

The instantaneous vehicle speed may then be used to calculate (and use) one or more correction factors. For example, in some embodiments, vehicle 110 may calculate a correction factor for direct application to conventionally-acquired vehicle speed measurements (e.g., vehicle speed measurements based on a dedicated sensor). Once the instantaneous vehicle speed as discussed herein is derived, vehicle 110 may calculate a correction factor by which a conventionally-acquired vehicle speed measurement may be multiplied to arrive at the instantaneous vehicle speed disclosed herein. Vehicle 110 may then correct subsequent conventionally-acquired vehicle speed measurements by multiplying them by that correction factor.

For some embodiments, vehicle 110 may calculate a correction factor for indirect application to conventionally-acquired vehicle speed measurements, by virtue of direct application to an operational parameter underlying conventionally-measured vehicle speeds (such as wheel size, final drive ratio, or tire air pressure). For example, vehicle 110 might acquire its conventional vehicle-speed measurements based on an assumed value of an underlying operational parameter: vehicle 110 may make an assumption about wheel size to calculate a vehicle-speed measurement in accordance with a formula based on a rotation rate of the wheels, or make an assumption about final drive ratio to calculate a vehicle-speed measurement in accordance with a formula based on a rotation rate of a driveshaft.

Once the instantaneous vehicle speed as discussed herein is derived, vehicle 110 may calculate a correction factor by which the assumed value of the underlying operational parameter may be multiplied such that a vehicle-speed measurement based on that assumed parameter will match the instantaneous vehicle speed. This calculation will depend upon the relationship between the operational parameter and the conventionally-acquired vehicle-speed measurements. Vehicle 110 may then correct subsequent conventionally-acquired vehicle speed measurements by multiplying the assumed value of the underlying operational parameter by that correction factor, then calculating a vehicle speed measurement based on the corrected value of the underlying operational parameter.

Figure 1B:
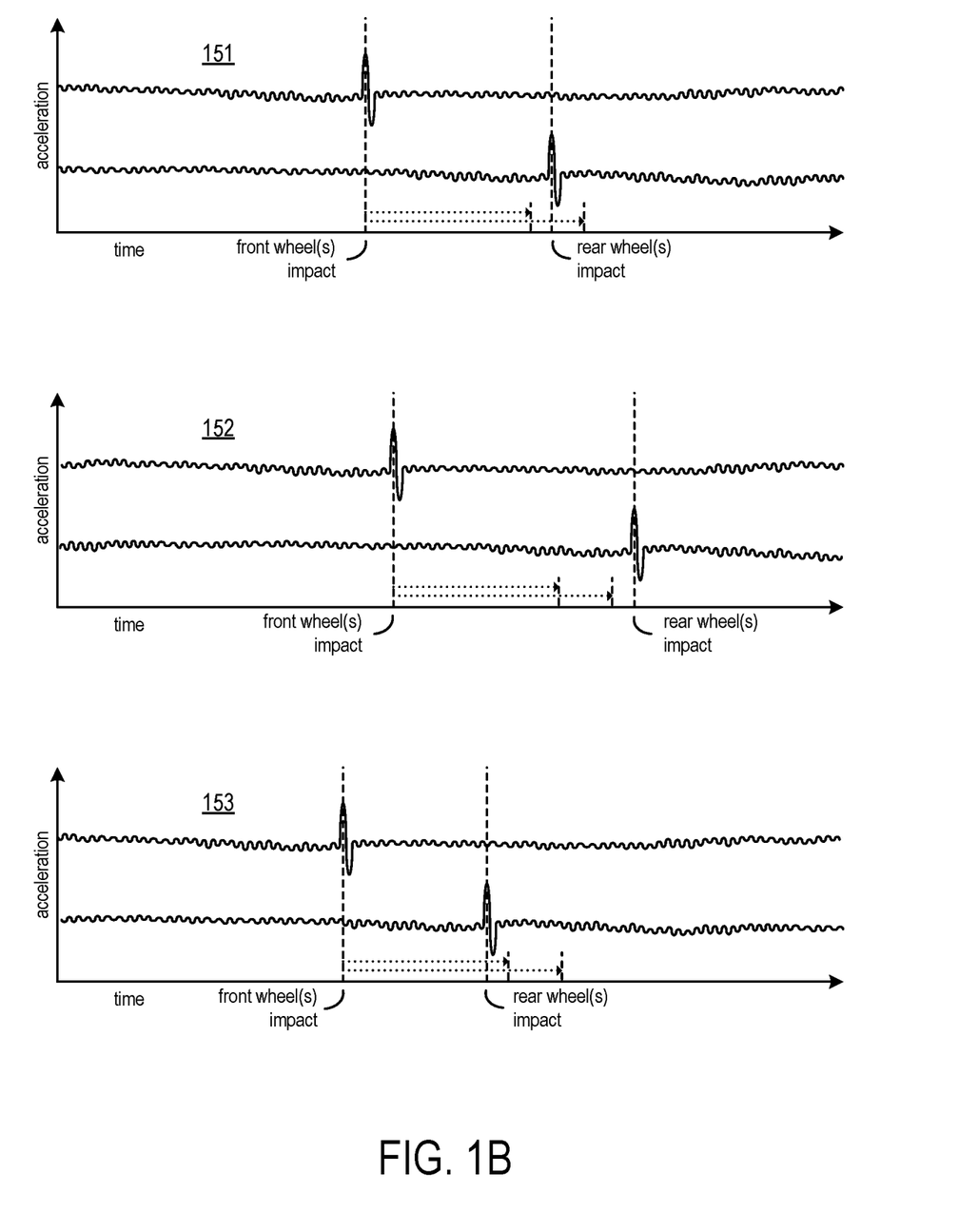
FIGS. 1B-1D show timelines related to vehicles passing roadway irregularities under various conditions.
Figure 1C:
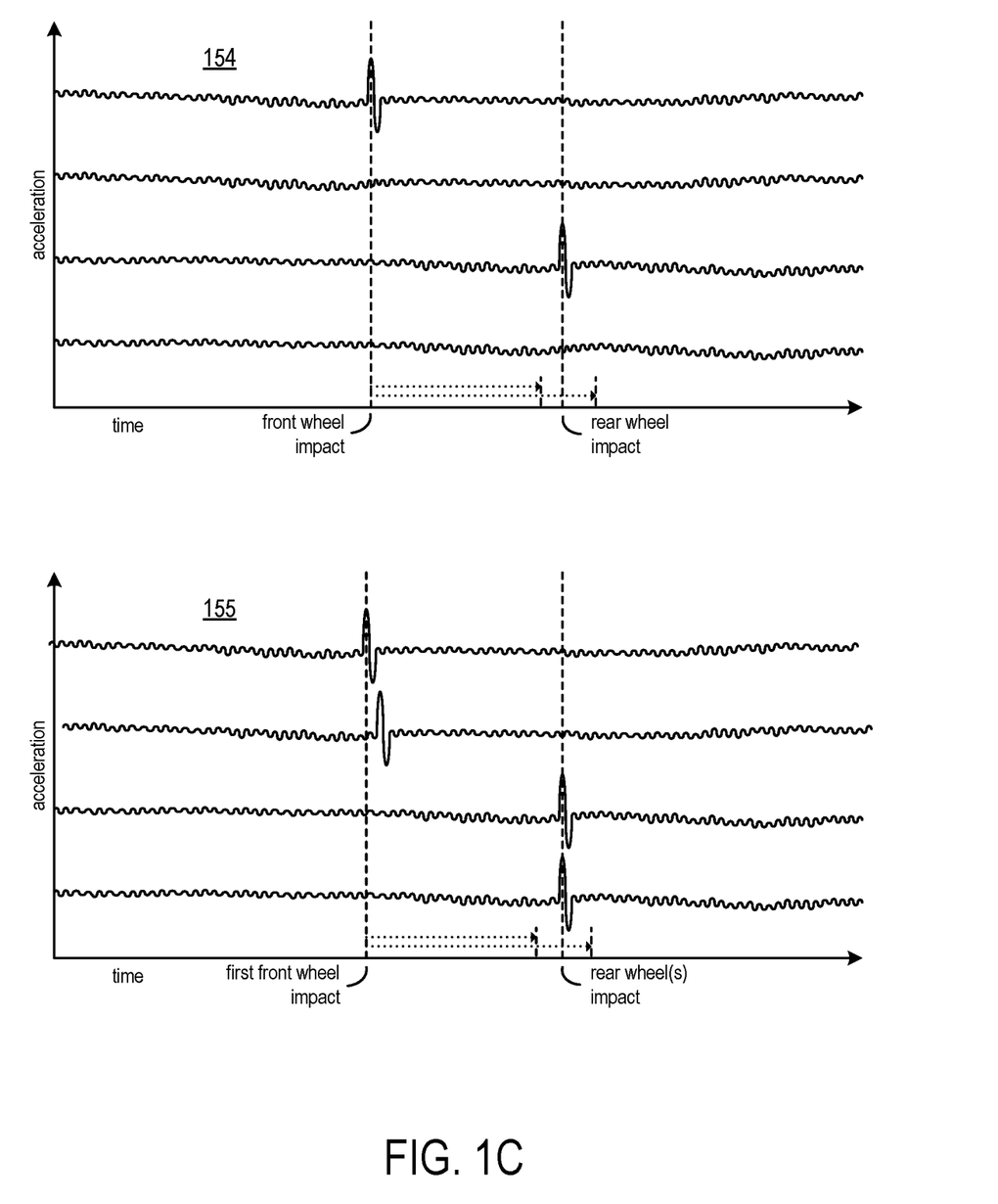
Figure 1D:
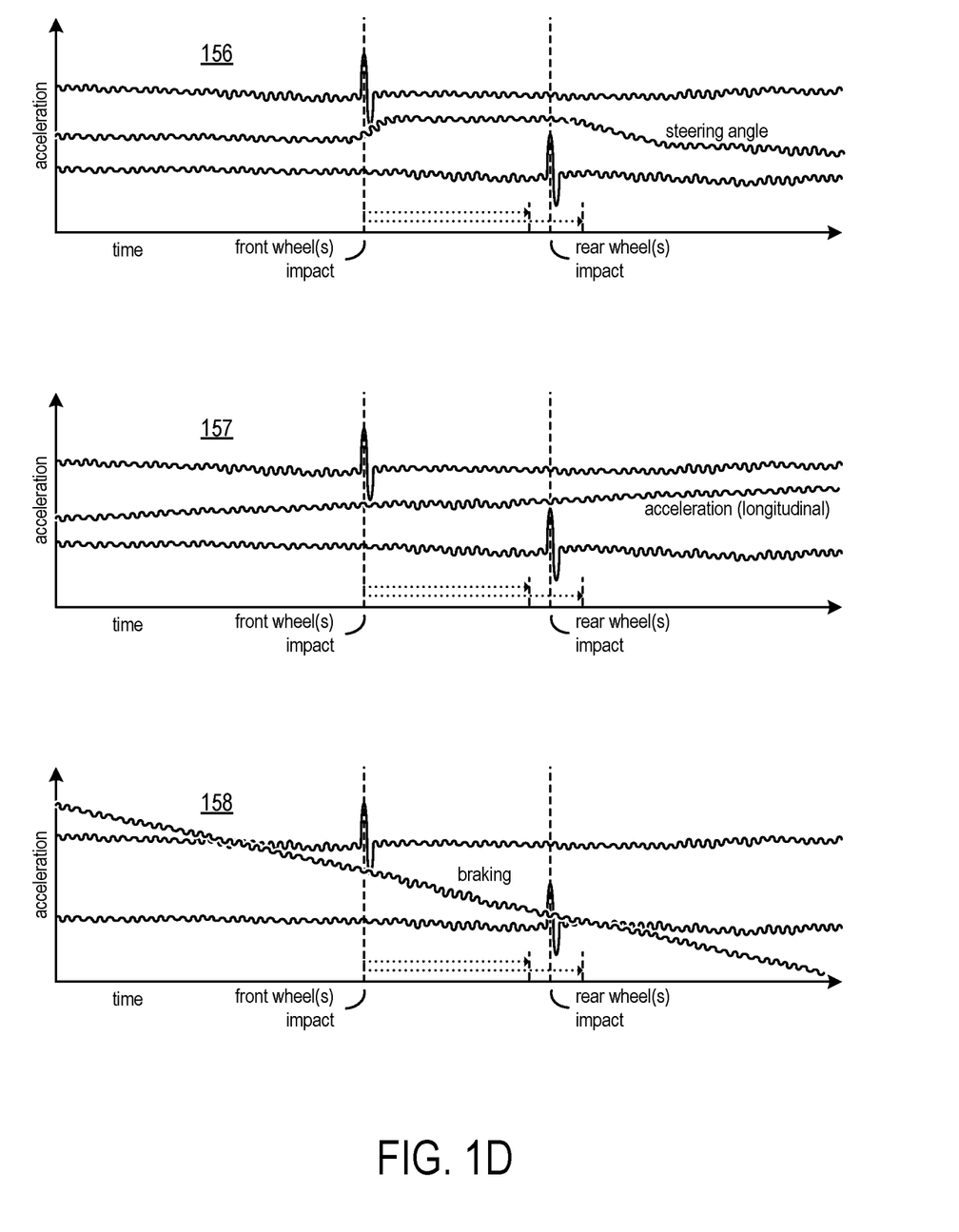

FIGS. 1B-1D show timelines related to vehicles passing roadway irregularities under various conditions. A first timeline 151 depicts desirable data-gathering conditions (which may be substantially similar to those discussed above regarding FIG. 1A). However, for various embodiments, an impact detection algorithm of vehicle 110 may determine that an undesirable data-gathering conditions exists, and may subsequently abort execution of an algorithm in progress.

For example, following the detection of a first impact, the timer may reset (and the impact detection algorithm will begin looking for another first impact) if a second impact is not detected within a predetermined range of time, which may be a function of a measured vehicle speed and/or wheelbase 118 (as depicted in a second timeline 152). Alternatively, following the detection of a first impact, the timer may reset (and the impact detection algorithm will begin looking for another first impact) if a second impact is detected before the start of a predetermined range of time (as depicted in a third timeline 153). Accordingly, one criteria for identifying that vehicle 110 has encountered an irregularity or bump may be that an elapsed duration between a first impact and a second impact falls within a predetermined range.

For embodiments in which vehicle 110 is capable of detecting separate impacts to left wheels and right wheels, another criteria for identifying that vehicle 110 has encountered an irregularity or bump may be that one or more wheels did not detect an impact that was detected by another wheel on the same end of vehicle 110. For example, if vehicle 110 detected an impact associated with one of front wheels 112 but did not detect an impact associated with another front wheel 112, or if vehicle 110 detected an impact associated with one of rear wheels 114 but did not detect an impact associated with another rear wheel 114 (as depicted in a fourth timeline 154), vehicle 110 may not identify that it has encountered an irregularity or bump, for purposes of its impact detection algorithm. Alternatively, vehicle 110 may identify that it has encountered an irregularity or bump, but may factor in data related to steering conditions to correct for the condition (as depicted in fifth timeline 155), such as by altering a wheelbase used for the calculation based on a known steering angle. For example, a vehicle may increase the wheelbase value used if the first impact is to a wheel on a side of the vehicle opposite to the side of the vehicle being turned into, or may decrease the wheelbase value used if the first impact is to a wheel on a side of the vehicle that is the same as the side of the vehicle being turned into.

In various embodiments, other criteria for identifying an irregularity or bump may relate to the consistence of a trajectory of vehicle 110 between the time of the first impact and the time of the second impact. For example, in some embodiments, a criterion for identifying an irregularity or bump may be that a direction of travel of the vehicle remains within a predetermined range between the first impact and the second impact (e.g., that the vehicle does not significantly turn, unlike the scenario depicted in a sixth timeline 156). For some embodiments, a criterion may be that an acceleration of the vehicle does not exceed a predetermined threshold between the first and second impacts (e.g., that the vehicle does not significantly speed up, unlike the scenario depicted in a seventh timeline 157), and/or that a braking of the vehicle does not exceed a predetermined threshold between the first and second impacts (e.g., that the vehicle does not significantly slow down, unlike the scenario depicted in an eighth timeline 158). For example, the predetermined thresholds for acceleration and braking may be set relatively close to zero, such that the errors they may introduce to instantaneous speed calculations may be less significant than the sorts of errors that conventionally-acquired vehicle speed measurements may incur. In various embodiments, the acceleration threshold and the braking threshold may be predetermined, non-zero values.

In various embodiments, the identification of irregularities and bumps may be qualified (or disqualified), or compensated for, in various ways. Some embodiments may make use of acceleration or braking during the traversal of wheelbase 118 over irregularity 120. Some embodiments may confirm irregularities or bumps identified on one or more wheels (e.g., front wheels 112) with signed pitch-variation (e.g., from a longitudinal accelerometer reading), which may rule out slipping on low-friction transitions. Some embodiments may make use of an assumed angle of bump to vehicle by evaluating a time offset between a left-side impact and a right-side impact, a yaw rate signal, a lateral acceleration signal, or a steering angle.

As disclosed herein, vehicle 110 may learn one or more correction factors that may be used to correct future conventionally-acquired speed measurements. The irregularities and bumps detected as disclosed herein may then be advantageously used to adaptively correct conventionally-acquired vehicle speeds (e.g., from sensors conventionally used to acquire vehicle speeds), and/or assumptions about underlying operational parameters of vehicle 110.

Accordingly, in various embodiments, vehicle speed recalibration systems may have mechanisms (such as vertical accelerometers or other mechanisms to determine vertical acceleration) to detect impacts to one or more front wheels and impacts to one or more rear wheels. A timer mechanism may then establish an elapsed duration between a time of the first impact a time of the second impact. One or more processors may then execute instructions stored in a non-transitory memory, the instructions causing the one or more processors to perform an operation comprising a calculating and an updating. In the calculating, an instantaneous vehicle speed may be calculated from a wheelbase of the vehicle and the elapsed duration. In the updating, a subsequent vehicle speed measurement may be updated based on the instantaneous vehicle speed (e.g., based on a correction factor, as discussed herein).

For some embodiments, a criterion for the detection the first impact and/or the second impact may be that a vertical acceleration exceeds a predetermined threshold. The threshold may be set sufficiently high to permit both front wheels and rear wheels to detect the same impacts on smooth roadway surfaces. In some embodiments, the operation may comprise an updating, in which a value of an operational parameter (e.g., a wheel size, or a final drive ratio) is updated, and the subsequent vehicle speed measurement is a function of the additional operational parameter. For some embodiments, the operation may comprise an aborting, in which the operation is aborted in response to detecting various conditions between the time of the first impact and the time of the second impact (such as a change in direction of travel of the vehicle in excess of a predetermined threshold, an acceleration of the vehicle in excess of a predetermined threshold, or a braking of the vehicle in excess of a predetermined threshold). In various embodiments, these thresholds may be predetermined, non-zero values.

Figure 2:
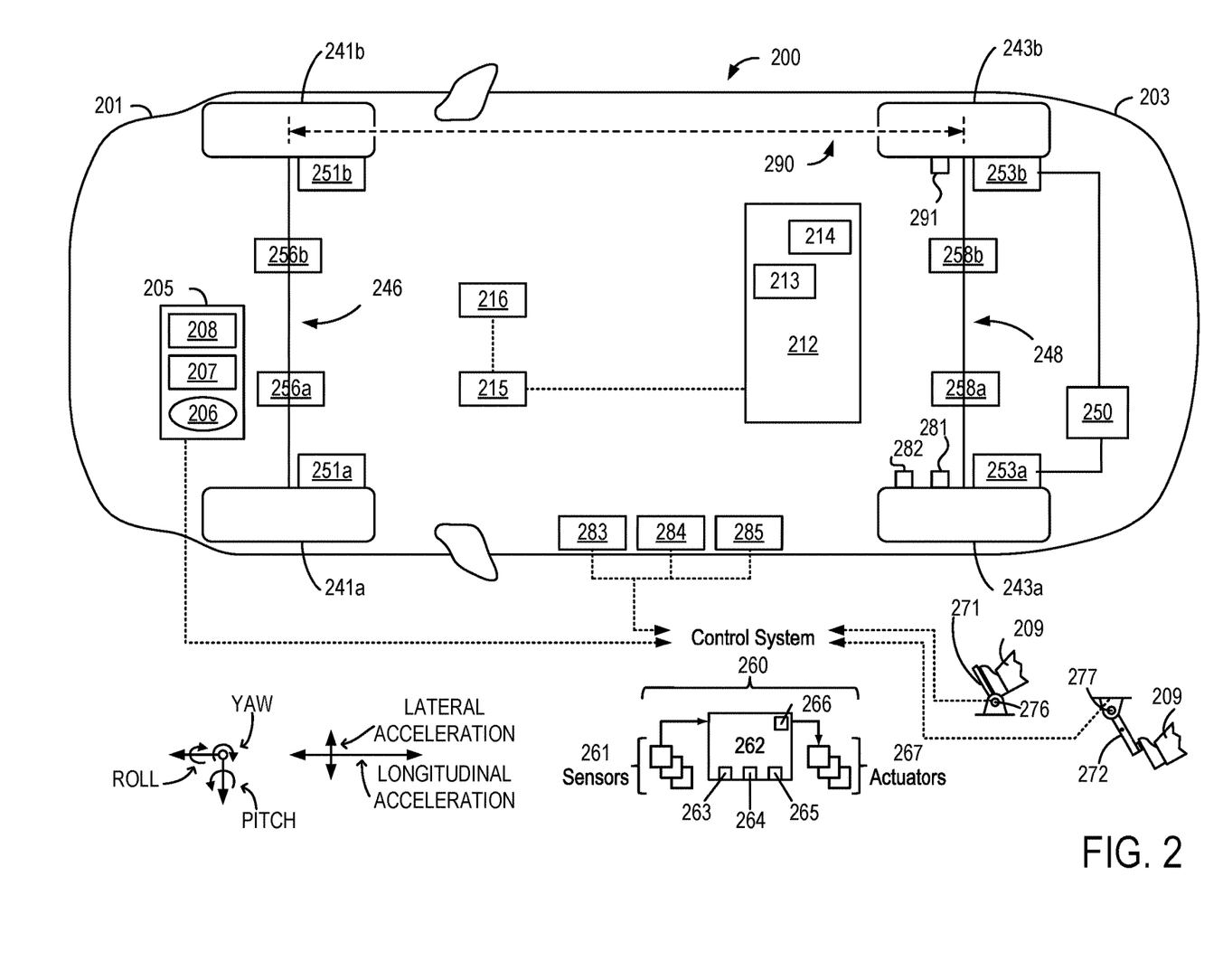
FIG. 2 shows a schematic top view of a vehicle incorporating mechanisms for improving vehicle speed measurements, in accordance with one or more embodiments of the present disclosure.

FIG. 2 illustrates an example vehicle 200, which may be substantially similar to vehicle 100. Mechanical connections between various components are illustrated as solid lines, whereas electrical connections between various components are illustrated as dashed lines. Vehicle 200 has a front axle 246 and front wheels positioned near a front 201 of vehicle 200. The front wheels include a left front wheel 241a and a right front wheel 241b, which are separately connected to front axle 246. Vehicle 200 also has a rear axle 248 and rear wheels positioned near a rear 203 of vehicle 200. The rear wheels include a left rear wheel 243a and a right rear wheel 243b, which are separately connected to rear axle 248. Vehicle 200 has a wheelbase 290, which is a distance between the centers of front wheels 241a and 241b and the centers of rear wheels 243a and 243b (as discussed herein).

Vehicle 200 includes a suspension system with a front suspension and a rear suspension. The front suspension includes a left front portion 256a and a right front portion 256b, and the rear suspension includes a left rear portion 258a and a right rear portion 258b. Suspension portions 256a, 256b, 258a, and 258b may comprise various hydraulic, electrical, and/or mechanical devices (such as coil springs, shock absorbers, and so on). The suspension system may also comprise one or more active-suspension elements that may control the vehicle height on an individual corner basis (e.g., four corner independently controlled vehicle heights), on an axle-by-axle basis (e.g., front-axle and rear-axle vehicle heights), or for a single vehicle height for the entire vehicle.

Vehicle 200 also includes one or more power sources, such as an internal combustion engine and/or one or more electric machines (e.g., motors). An electric machine of vehicle 200 may be configured to utilize or consume a different energy source than an engine of vehicle 200. For example, an engine may consume liquid fuel (e.g., gasoline) to produce an engine output, while an electric machine may consume electrical energy to produce an electric machine output. In various modes of propulsion, front wheels 241a and 241b and/or rear wheels 243a and 243b may be driven (e.g., through a driveline, a transmission, a driveshaft, and so on) by an engine of vehicle 200 (e.g., in an engine-only propulsion mode), by one or more electric machines of vehicle 200 (e.g., in an electric-drive-only propulsion mode), or by both (e.g., in a hybrid fashion). In some embodiments in which vehicle 200 has both an internal combustion engine and an electric motor, vehicle 200 may be referred to as a hybrid electric vehicle (HEV).

Vehicle 200 also has a braking system, with front brakes and rear brakes. The front brakes include a left front brake 251a and a right front brake 251b, and the rear brakes include a left rear brake 253a and a right rear brake 253b. Brakes 251a, 251b, 253a, and 253b may comprise friction brakes and/or foundation brakes. Left front wheel 241a, right front wheel 241b, left rear wheel 243a, and right rear wheel 243b may be slowed, respectively, upon application of left front brake 251a, right front brake 251b, left rear brake 253a, and right rear brake 253b. The braking system also comprises a braking controller 250.

Vehicle 200 includes an onboard electrical energy storage device 212, which may comprise one or more batteries, one or more capacitors, one or more inductors, and/or one or more other electrical energy storage elements. In some examples, electrical energy storage device 212 may be configured to store electrical energy that may be supplied to various electrical loads residing on-board the vehicle. Electrical energy storage device 212 includes an electrical energy storage device controller 213 and a power distribution module 214. Electrical energy storage device controller 213 may provide charge balancing between various energy storage elements (e.g., battery cells) and communication with other vehicle controllers (e.g., a vehicle system controller, as discussed herein). Power distribution module 214 may control the flow of power into and out of electrical energy storage device 212.

Vehicle 200 may include a power distribution box (PDB) 215, which may be used for routing electrical power throughout various circuits and accessories in the vehicle's electrical system. Vehicle 200 may further include a high current fuse box (HCFB) 245, and may comprise a variety of fuses (not shown) used to protect the wiring and electrical components of vehicle 200.

A vehicle control system 260 may communicate with and/or control various parts of vehicle 200 (such as its suspension system, brakes, engine, electric machines, transmission, electrical energy storage device, and so on). Control system 260 may comprise a vehicle system controller 262, which may in turn include a microcontroller 263 (comprising, e.g., one or more processors), a non-transitory memory 264 (e.g., a read-only memory), a random access memory 265, and analog/digital inputs/outputs 266. In some examples, controller 262 may be a single controller of the vehicle. Controller 262 may be programmed with computer readable data representing instructions executable to perform the methods described below as well as other variants that are anticipated but not specifically listed.

Control system 260 may receive signals and/or information (e.g., sensory feedback) from a variety of sensors 261 coupled to the various parts of vehicle 200. The various sensors may include, for example, temperature sensors, pressure sensors, and air-fuel ratio sensors, and other sensors described herein. Responsive to these signals and/or information, control system 260 may send control signals to a variety of actuators 267 coupled to the various parts of vehicle 200. The various actuators may include for example, various valves, throttles, and fuel injectors. Control system 260 may receive the information and/or send the control signals via one or more vehicle busses, which may extend between the various parts of vehicle 200 in a variety of configurations.

Control system 260 may also receive indications of various operator-requested functions of vehicle 200 (e.g., from a human operator 209 of the vehicle, or an autonomous controller). As an example, control system 260 may receive sensory feedback from a pedal-position sensor 276 which communicates with an accelerator pedal 271 being pressed by operator 209. As another example, control system 260 may receive sensory feedback from a pedal-position sensor 277 which communicates with a brake pedal 272 being pressed by operator 209. In some embodiments, braking controller 250 may respond to a position of brake pedal 272 and commands from controller 262.

Vehicle 200 may also include one or more inertial sensors 285, which may comprise various longitudinal sensors, lateral sensors, vertical sensors, yaw sensors, roll sensors, and/or pitch sensors (e.g., accelerometers). (Directions of yaw, pitch, and roll, as well as directions of lateral acceleration and longitudinal acceleration, are as indicated.) Vehicle 200 may further include an accelerometer 283 and/or an inclinometer 284.

Data from inertial sensors 285 (as well as data from accelerometer 283 and/or inclinometer 284) may be communicated to controller 262 in a variety of ways. In some embodiments, inertial sensors 285 may be electrically coupled to controller 262. Control system 260 may adjust an engine output, one or more electrical machine outputs, and/or wheel brakes to increase vehicle stability in response to such sensors. For some embodiments, control system 260 may adjust one or more active-suspension element of vehicle 200 (e.g., responsive to input from inertial sensors 285).

One or more wheel-speed sensors (WSS) 281 may be coupled, respectively, to one or more wheels of vehicle 200. The wheel speed sensors may detect a rotational speed of each wheel. In some embodiments, a WSS 281 may include a permanent magnet type of sensor. One or more tire pressure monitoring sensors (TPMS) may also be coupled, respectively, to one or more tires of wheels in the vehicle. For example, FIG. 2 shows a tire pressure sensor 282 coupled to left rear wheel 243a, which may be configured to monitor a pressure in a tire of left rear wheel 243a. (While not explicitly illustrated, it may be understood that each of the four tires indicated in FIG. 2 may include at least one WWS 281 and/or at least one tire pressure sensor 282.) Wheel speed sensors 281 tire pressure monitoring sensors 282 may also provide information to control system 260.

Sensors 261 may also comprise one or more vertical acceleration sensors 291, which may be coupled to one or more wheels of vehicle 200, respectively. In some embodiments, vertical acceleration sensors 291 may be accelerometers, and may be operable to directly measure vertical acceleration. In some embodiments, vertical sensors 291 may comprise other sensors (such as longitudinal accelerometers, lateral accelerometers, inclinometers, yaw sensors, roll sensors, and/or pitch sensors, whose outputs may be used (either locally at the sensor, or by control system 260) to determine a vertical acceleration, as discussed herein for example.

Control system 260 (or another part of vehicle 200) may receive output from vertical acceleration sensors 291, and may use that output to detect impacts to various suspensions and/or wheels of vehicle 200. Control system 260 may then correct a vehicle speed measurement obtained by, for example, a WSS 281. The corrected vehicle speed measurement may then be communicated to operator 209, for example, and/or used by a cruise-control system (such as a cruise-control system administered by control system 260)

Vehicle 200 may also include a dashboard 205 and an operator interface 206 by which operator 209 may adjust the operating status of the vehicle. For example, operator interface 206 may be configured to initiate and/or terminate operation of a driveline of vehicle 200 based on an operator input (e.g., by turning on and turning off an engine and/or one or more electric machines).

Various examples of operator interface 206 may include interfaces that require a physical apparatus such as an active key that may be inserted into operator interface 206 to turn on the vehicle, or may be removed to turn off the vehicle. Other examples may include a passive key that is communicatively coupled to operator interface 206. The passive key may be configured as an electronic key fob or a smart key that does not have to be inserted or removed from operator interface 206. Instead, the passive key may need to be located inside or proximate to vehicle 200 and/or operator interface 206 (e.g., within a threshold distance) to enable operation. Still other examples may additionally or optionally use a start/stop button that is manually pressed by operator 209 to turn on or turn off vehicle 200. In other examples, an engine or electric machine may be turned on or turned off by a remote computing device (not shown), for example by a cellular telephone, or by a smartphone-based system in which a cellular telephone sends data to a server and the server communicates with controller 212 to turn the vehicle on.

Dashboard 205 may further include a display system 207 configured to display information to operator 209. Display system 207 may comprise, as a non-limiting example, a touchscreen or human machine interface (HMI) display which enables operator 209 to view graphical information as well as to input commands. In some examples, display system 207 may be connected wirelessly to the internet (not shown) via a controller (e.g., controller 262). As such, in some examples, operator 209 may communicate via display system 207 with an internet site or software application (app).

Dashboard 205 may further include an on-board navigation system 208 that operator 209 of the vehicle may interact with (for example, a Global Positioning System (GPS) based navigation system). Navigation system 208 may include one or more location sensors for assisting in estimating a location (e.g., geographical coordinates) of the vehicle. For example, navigation system 208 may receive signals from GPS satellites (not shown), and may identify the geographical location of the vehicle based on the signals. In some examples, the geographical location coordinates may be communicated to controller 262.

In some examples, navigation system 208 may be integrated with display system 207. In various embodiments, operator interface 206, display system 207, and/or navigation system 208 may interact with control system 260 and/or controller 262 in a variety of ways.

Figure 3:
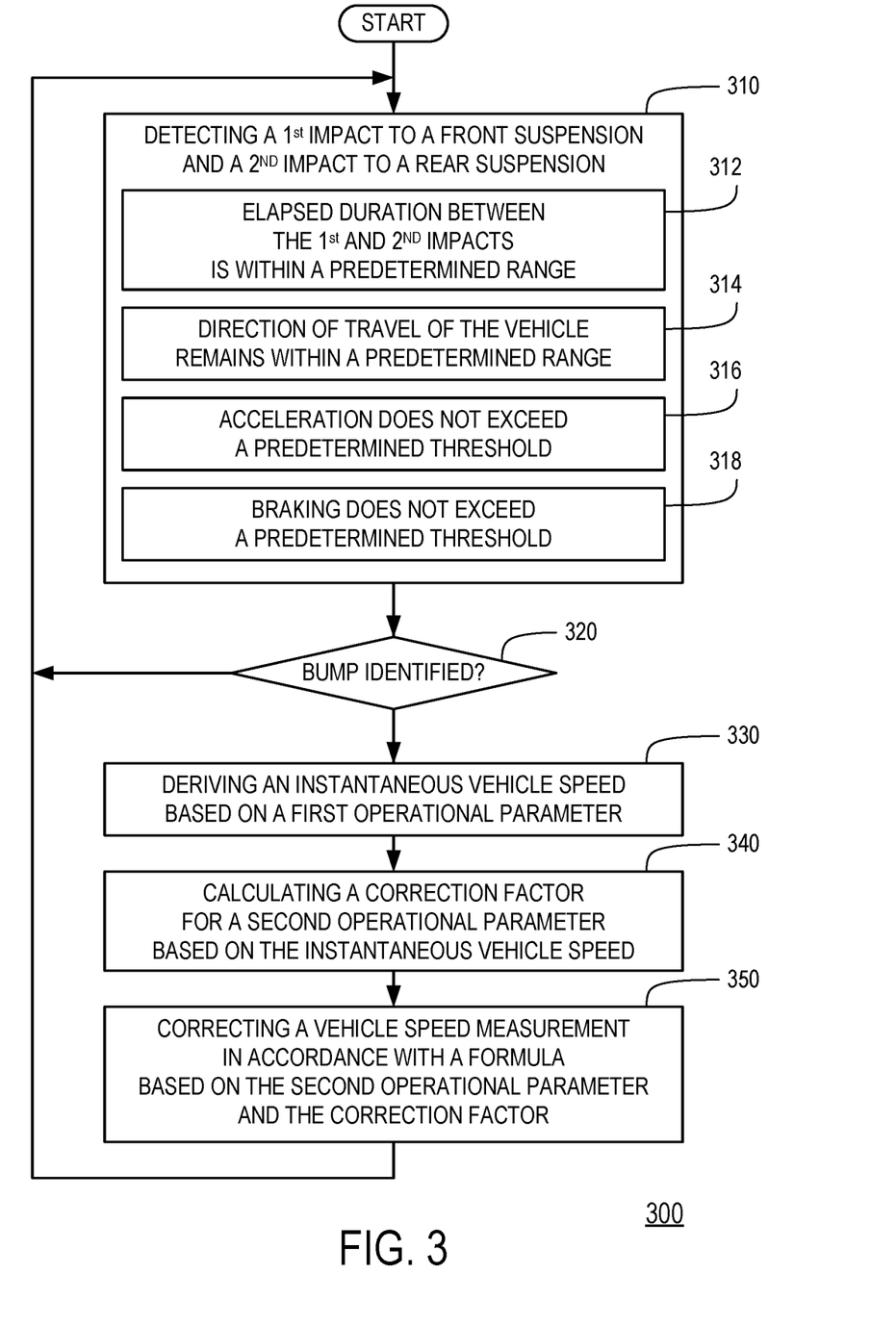
FIG. 3 shows an example method of identifying roadway irregularities and correcting for operational parameter of a vehicle propulsion system.

FIG. 3 shows an example method 300 of identifying roadway irregularities and correcting for operational parameter of a vehicle propulsion system. Method 300 may comprise a detecting 310, an identifying 320, a deriving 330, and a calculating 340. In various embodiments, method 300 may also comprise a correcting 350.

In detecting 310, a first impact to a front suspension and a second impact to a rear suspension may be detected for a vehicle in motion (e.g., the front suspension and the rear suspension of vehicle 110 and/or the various portions of the front and rear suspensions of vehicle 200). In identifying 320, the detection of the first impact and the second impact may identify an irregularity or bump (such as irregularity 330). In deriving 330, when the irregularity or bump is identified, an instantaneous vehicle speed may be derived based on a first operational parameter of the vehicle (e.g., wheelbase 118 of vehicle 110 and/or wheelbase 290 of vehicle 200). In calculating 340, a correction factor may be calculated for a second operational parameter of the vehicle (e.g., a wheel size, a final drive ratio, or a tire air pressure) based on the instantaneous vehicle speed, as disclosed herein.

In some embodiments, in correcting 350, a subsequent vehicle speed measurement may be corrected (as disclosed herein) in accordance with a formula based on the second operational parameter and the correction factor. For some embodiments a criterion for detecting the first impact and/or the second impact may be that a vertical acceleration associated with the impact (e.g., a vertical acceleration associated with a front or rear suspension, or with one or more wheels) exceeds a predetermined threshold (which may be a predetermined, non-zero value).

For some embodiments, a criterion 312 for identifying the irregularity or bump may be that an elapsed duration between the first impact and the second impact falls within a predetermined range, which may in turn be a function of a vehicle speed measurement and/or a function of a wheel base of the vehicle. In some embodiments, a criterion 314 for identifying the irregularity or bump may be that a direction of travel of the vehicle remains within a predetermined range between the first and second impacts. In some embodiments, a criterion 316 for identifying the irregularity or bump may be that a longitudinal acceleration of the vehicle does not exceed a predetermined threshold between the first and second impacts. In some embodiments, a criterion 318 for identifying the irregularity or bump may be that a braking of the vehicle does not exceed a predetermined threshold between the first and second impacts. In various embodiments, the acceleration threshold and the braking threshold may be predetermined, non-zero values.

Figure 4:
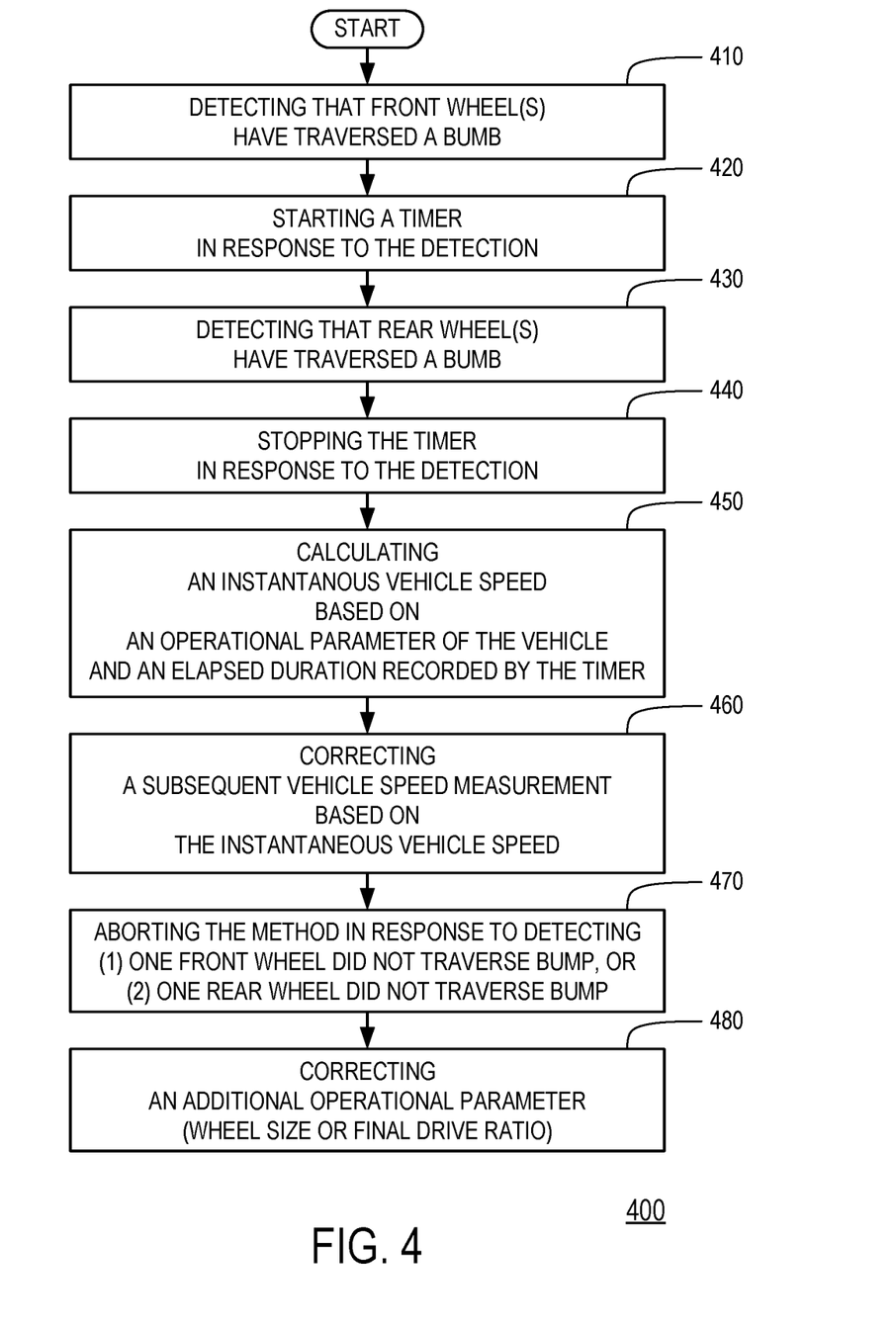
FIG. 4 shows an example method of calculating instantaneous vehicle speeds based on traversed roadway irregularities and correcting vehicle-speed measurements of a vehicle propulsion system.

FIG. 4 shows an example method 400 of calculating instantaneous vehicle speeds based on traversed roadway irregularities and correcting measurements of a vehicle propulsion system. Method 400 may comprise a detecting 410, a starting 420, a detecting 430, a stopping 440, a calculating 450, and a correcting 460. In some embodiments, method 400 may comprise a an aborting 470 and/or a correcting 480.

In detecting 410, one or more front wheels of a vehicle (e.g., front wheels 112 of vehicle 100 and/or front wheels 241a and 241b of vehicle 200) may be detected as having traversed a bump. In starting 420, a timer may be started in response to detecting that the front wheels have traversed a bump. In some embodiments, the timer may be a dedicated device, and in some embodiments, the timer may be implemented, at least in part, by a vehicle control system and/or controller thereof (such as vehicle control system 262 and/or controller 260 thereof). In detecting 430, one or more rear wheels of the vehicle has may be detected as having traversed a bump. In stopping 440, the timer may be stopped in response to detecting that the rear wheels have traversed a bump. In calculating 450, an instantaneous vehicle speed may be calculated based on an operational parameter of the vehicle (e.g., a wheelbase 118) and an elapsed duration recorded by the timer (e.g., between the starting of the timer and the stopping of the timer). In correcting 460, a subsequent vehicle speed measurement (e.g., a conventionally-acquired vehicle speed measurement, which may be based on an output from a dedicated sensor) may be corrected based on the instantaneous vehicle speed.

In some embodiments, in aborting 470, method 400 may be aborted in response to any of the criteria for identifying irregularities or bumps disclosed herein. For example, method 400 may be aborted in response to detecting either that one wheel of the front wheels did not traverse the bump, or that one wheel of the rear wheels did not traverse the bump. For some embodiments, in correcting 480, a value of an additional operational parameter may be corrected (e.g., a wheel size, or a final drive ratio), and the subsequent vehicle speed measurement may be a function of the additional operational parameter.

At least portions of methods 300 and/or 400 may be performed by a vehicle 100 and/or a vehicle 200 as shown in FIGS. 1A and 2. In some embodiments, methods 300 and/or 400 may be performed real-time in a vehicle driving on a road.

In some embodiments, at least some portions of methods 300 and/or 400 may be incorporated into a controller of a vehicle control system, such as controller 260 of vehicle control system 262 of FIG. 2, as executable instructions stored in non-transitory memory. For some embodiments, at last some portions of methods 300 and/or 400 may be performed via a controller transforming operating states of actuators and/or other devices in the physical world, such as actuators 267 of FIG. 2. Instructions for carrying out methods 300 and/or 400 may be executed by the controller, based on instructions stored in a memory of the controller, and in conjunction with signals received from sensors and/or other devices in the physical world, such as sensors 26 of FIG. 2. The various instructions may provide a control routine.

Figure 5:
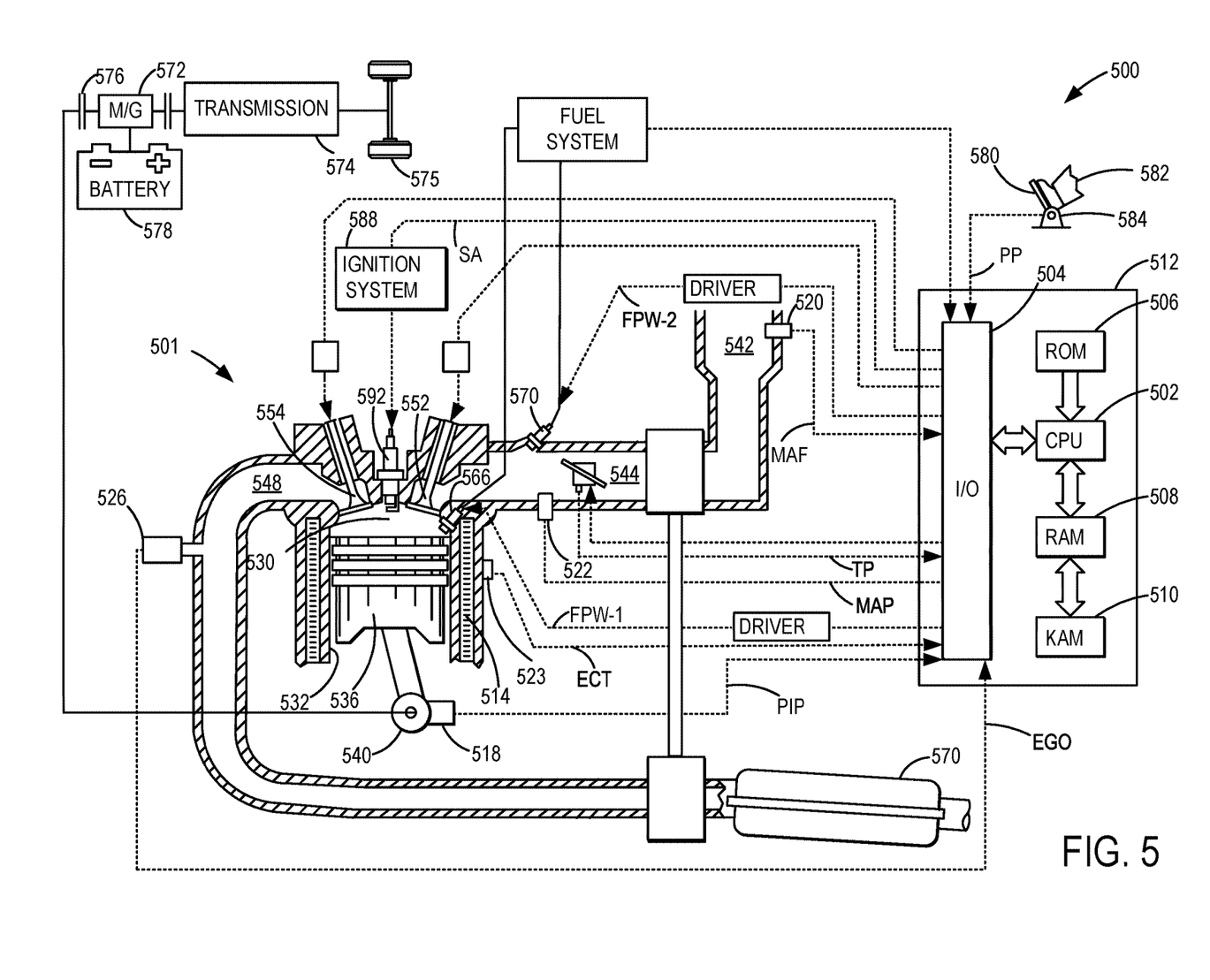
FIG. 5 depicts a vehicle propulsion system incorporating mechanisms for improving wheel speed measurements.

FIG. 5 depicts a vehicle 500 (which may be substantially similar to vehicle 100 and/or vehicle 200) having a vehicle propulsion system with an internal combustion engine 501. As described herein, FIG. 5 shows one cylinder of engine 501. However, engine 501 may have a plurality of cylinders similar to the cylinder shown, along with corresponding pluralities of pistons, intake valves, exhaust valves, fuel injectors, spark plugs, and so forth.

Engine 501 may be controlled at least partially by a control system including a controller 512 and by input from a vehicle operator 582 via various input devices. In this example, an input device 580 includes an accelerator pedal and a pedal position sensor 584 for sensing force applied (e.g., by a foot of operator 582) and generating a pedal position signal (e.g., proportional to the sensed force). Controller 512 may be substantially similar to controller 262 of control system 260.

Engine 501 includes a combustion chamber 530 and a cylinder formed by cylinder walls 532. A piston 536 positioned therein may be coupled to a crankshaft 540 so that a reciprocating motion of the piston is translated into a rotational motion of the crankshaft. Crankshaft 540 may be coupled to at least one drive wheel of vehicle 500 via an intermediate transmission system. Further, a starter motor may be coupled to crankshaft 540 via a flywheel to enable a starting operation of engine 501.

Combustion chamber 530 may receive intake air from an intake manifold 544 via an intake passage 542 and may exhaust combustion gases via an exhaust manifold 548. Intake manifold 544 and exhaust manifold 548 can selectively communicate with combustion chamber 530 via an intake valve 552 and an exhaust valve 554, respectively. In some examples, combustion chamber 530 may include two or more intake valves and/or two or more exhaust valves.

A fuel injector 566 is coupled directly to combustion chamber 530 for injecting fuel directly therein (e.g., via direct injection). The fuel may be injected in proportion to a pulse width of a signal received from controller 512. The fuel injector may be mounted in the side of the combustion chamber or in the top of the combustion chamber, for example. Fuel may be delivered to fuel injector 566 by a fuel system which may include a fuel tank, a fuel pump, and/or a fuel rail. In some examples, a high pressure, dual stage fuel system may be used to generate higher fuel pressures. For some examples, combustion chamber 530 may alternatively or additionally include a fuel injector arranged in intake manifold 544 in a configuration that provides what is known as port injection of fuel into the intake port, upstream of combustion chamber 530.

A distributorless ignition system 588 provides an ignition spark to combustion chamber 530 via a spark plug 592 (e.g., in response to controller 512). The ignition system may further comprise an ignition coil (not shown) for increasing voltage supplied to spark plug 592. In other examples, such as examples based on diesel fuel, spark plug 592 may be omitted.

During operation, each cylinder within engine 501 typically undergoes a four stroke cycle having an intake stroke, a compression stroke, an expansion stroke, and an exhaust stroke. During the intake stroke, generally, the exhaust valve 554 closes and intake valve 552 opens. Air is introduced into combustion chamber 530 via intake manifold 544, and piston 536 moves to the bottom of the cylinder so as to increase the volume within combustion chamber 530. The position at which piston 536 is near the bottom of the cylinder and at the end of its stroke (e.g., when combustion chamber 530 is at its largest volume) is typically referred to by those of skill in the art as bottom dead center (BDC).

During the compression stroke, intake valve 552 and exhaust valve 554 are closed. Piston 536 moves toward the cylinder head so as to compress the air within combustion chamber 530. The point at which piston 536 is at the end of its stroke and closest to the cylinder head (e.g., when combustion chamber 530 is at its smallest volume) is typically referred to by those of skill in the art as top dead center (TDC). In a process referred to as injection, fuel is introduced into the combustion chamber. In a process referred to as ignition, the injected fuel is ignited by known ignition means (such as spark plug 592), resulting in combustion.

During the expansion stroke, the expanding gases push piston 536 back to BDC, and crankshaft 540 converts piston movement into a rotational torque of the rotary shaft. Finally, during the exhaust stroke, the exhaust valve 554 opens to release the combusted air-fuel mixture to exhaust manifold 548, and the piston returns to TDC.

Note that the above is shown merely as an example, and that intake and exhaust valve opening and/or closing timings may vary (such as to provide positive or negative valve overlap, late intake valve closing, or various other examples).

An exhaust gas sensor 526 is shown coupled to exhaust manifold 548 upstream of a catalytic converter 570 in a direction of exhaust flow. The sensor 526 may be any suitable sensor for providing an indication of exhaust gas air-fuel ratio, such as a linear oxygen sensor or UEGO (universal or wide-range exhaust gas oxygen) sensor, a two-state exhaust gas oxygen sensor or EGO sensor, a HEGO (heated EGO) sensor, a $NO_x$ sensor, an HC sensor, or a CO sensor. In one example, upstream exhaust gas sensor 526 is a UEGO configured to provide output, such as a voltage signal, that is proportional to the amount of oxygen present in the exhaust. Controller 512 may convert an oxygen sensor output into an exhaust gas air-fuel ratio via an oxygen sensor transfer function.

Converter 570 can include multiple catalyst bricks, in one example. In another example, multiple emission control devices, each with multiple bricks, can be used. Converter 570 can be a three-way type catalyst in one example.

Controller 512 is shown in FIG. 3 as a microcomputer, including a microprocessor unit 502, input/output ports 504, an electronic storage medium for storing executable programs and calibration values which is shown as a read only memory chip 506 (e.g., non-transitory memory) in this particular example, a random access memory 508, and/or a keep alive memory 510, which may be interconnected by various control busses and/or data busses. Other controllers mentioned herein may have similar designs and configurations. The storage medium read-only memory 506 can be programmed with computer readable data representing non-transitory instructions executable by the microprocessor unit 502 for performing at least portions of the methods described herein, as well as other variants of the methods described herein that are anticipated but not specifically listed.

Controller 512 may receive signals from various sensors coupled to engine 501. Controller 512 may also receive input from an operator/machine interface (e.g., pushbutton or touch screen display). In addition to receiving signals from sensors previously discussed, controller 512 may receive signals including: an engine coolant temperature (ECT) from a temperature sensor 523 coupled to a cooling sleeve 514; a measurement of engine manifold pressure (MAP) from pressure sensor 522 coupled to intake manifold 544; an engine position signal from a crankshaft position sensor 518 (e.g., a Hall effect sensor, or another type of sensor) sensing a position of crankshaft 540; a measurement of air mass entering the engine from sensor 520; and/or a manifold pressure signal (which may provide an indication of vacuum, or pressure, in the intake manifold 544). Barometric pressure may also be sensed (sensor not shown) for processing by controller 512.

In one example, the crankshaft position sensor 518 may produce a predetermined number of equally spaced pulses every revolution of the crankshaft, from which engine speed (RPM) can be generated or determined (e.g., via controller 512). Accordingly, crankshaft position sensor 518 may also be used as an engine speed sensor. During engine operation, engine torque may be inferred from the output of MAP sensor 522 and engine speed. Further, this sensor, along with the detected engine speed, may be a basis for estimating charge (including air) inducted into the cylinder.

Vehicle 500 is depicted as having a spark ignition engine. However, in various examples, the vehicle propulsion system of vehicle 500 may include a diesel engine, a turbine, or an electric machine. In some examples, vehicle 500 may be a hybrid vehicle (e.g., a hybrid electric vehicle) with multiple sources of torque available to one or more vehicle wheels 575. In other examples, vehicle 500 is a conventional vehicle with only an engine, or an electric vehicle with only electric machine(s).

In the example shown, vehicle 500 includes engine 501 and an electric machine 572. Electric machine 572 may be a motor or a motor/generator. Crankshaft 540 of engine 501 and electric machine 572 are connected via a transmission 574 to vehicle wheels 575 when one or more clutches 576 are engaged. In the depicted example, a first clutch 576 is provided between crankshaft 540 and electric machine 572, and a second clutch 576 is provided between electric machine 572 and transmission 574. Controller 512 may send a signal to an actuator of each clutch 576 to engage or disengage the clutch, so as to connect or disconnect crankshaft 540 from electric machine 572 and the components connected thereto, and/or connect or disconnect electric machine 572 from transmission 574 and the components connected thereto. Transmission 574 may be a gearbox, a planetary gear system, or another type of transmission. The powertrain may be configured in various manners including as a parallel, a series, or a series-parallel hybrid vehicle.

Electric machine 572 receives electrical power from a traction battery 578 to provide torque to vehicle wheels 575. Electric machine 572 may also be operated as a generator to provide electrical power to charge battery 578, for example during a braking operation. Accordingly, methods 300 and 400 may be carried out by a hybrid vehicle, such as vehicle 500.

In this way, by employing the mechanisms and methods disclosed herein, a vehicle may advantageously account for variances in actual values of operational parameters in comparison with assumed or expected values of those operational parameters (such as wheel size, and final drive ratio). By taking instantaneous vehicle speed measurements based upon a relatively more fixed operational parameter of the vehicle (such as a wheelbase of the vehicle), the actual values of other operational parameters may be properly accounted for. A technical effect of the disclosed mechanisms and methods may accordingly be to adjust or otherwise improve vehicle speed measurements when operational parameters underlying those vehicle speed measurements have changed.

In a first approach to the methods and systems discussed herein, a first example of a method comprises: detecting, for a vehicle in motion, a first impact to a front suspension and a second impact to a rear suspension, to identify a bump; deriving, when the bump is identified, an instantaneous vehicle speed based on a first operational parameter of the vehicle; and calculating a correction factor for a second operational parameter of the vehicle based on the instantaneous vehicle speed. Building off of the first example, in a second example of the method, the first operational parameter of the vehicle is a wheelbase of the vehicle. Building off of either the first example or the second example, in a third example of the method, the second operational parameter of the vehicle is one of: a wheel size, a final drive ratio, and a tire air pressure. Building off of any of the first example through the third example, a fourth example of the method further comprises: correcting a subsequent vehicle speed measurement in accordance with a formula based on the second operational parameter and the correction factor. Building off of any of the first example through the fourth example, in a fifth example of the method, a criterion for detecting at least one of the first impact and the second impact is that a vertical acceleration exceeds a predetermined threshold. Building off of any of the first example through the fifth example, in a sixth example of the method, a criterion for identifying the bump is that an elapsed duration between the first impact and the second impact falls within a predetermined range. Building off of the sixth example, in a seventh example of the method, the predetermined range is a function of a vehicle speed measurement. Building off of either the sixth example or the seventh example, in an eighth example of the method, the predetermined range is a function of a wheelbase of the vehicle. Building off of any of the first example through the eighth example, in a ninth example of the method, a criterion for identifying the bump is that a direction of travel of the vehicle remains within a predetermined range between a time of the first impact and a time of the second impact. Building off of any of the first example through the ninth example, in a tenth example of the method, a criterion for identifying the bump is that a longitudinal acceleration of the vehicle does not exceed a predetermined threshold between a time of the first impact and a time of the second impact. Building off of any of the first example through the tenth example, in an eleventh example of the method, a criterion for identifying the bump is that a braking of the vehicle does not exceed a predetermined threshold between a time of the first impact and a time of the second impact.

In a second approach to the methods and systems discussed herein, a first example of a method of correcting vehicle speed measurements comprises: detecting that one or more front wheels of a vehicle has traversed a bump; starting a timer in response to the detection that the one or more front wheels has traversed a bump; detecting that one or more rear wheels of the vehicle has traversed a bump; stopping the timer in response to the detection that the one or more rear wheels has traversed a bump; calculating an instantaneous vehicle speed based on an operational parameter of the vehicle and an elapsed duration recorded by the timer; and correcting a subsequent vehicle speed measurement based on the instantaneous vehicle speed. Building off of the first example, in a second example of the method, the operational parameter of the vehicle is a wheelbase of the vehicle. Building off of either the first example or the second example, a third example of the method further comprises: aborting the method in response to detecting either that one wheel of the front wheels did not traverse the bump, or that one wheel of the rear wheels did not traverse the bump. Building off of any of the first example through the third example, in a fourth example of the method, the subsequent vehicle speed measurement is based on an output from a dedicated sensor. Building off of any of the first example through the fourth example, a fifth example of the method further comprises: correcting a value of an additional operational parameter selected from: a wheel size, or a final drive ratio, the subsequent vehicle speed measurement being a function of the additional operational parameter.

In a third approach to the methods and systems discussed herein, a first example of a vehicle speed recalibration system for a vehicle having a set of front wheels and a set of rear wheels comprises: a mechanism to detect a first impact in which at least one of the front wheels has traversed a bump; a mechanism to detect a second impact in which at least one of the rear wheels has traversed a bump; a timer mechanism to establish an elapsed duration between a first time at which the first impact was detected and a second time at which the second impact was detected; and one or more processors to execute instructions stored in a non-transitory memory, the instructions causing the one or more processors to perform an operation comprising: calculate an instantaneous vehicle speed from a wheelbase of the vehicle and the elapsed duration; and update a subsequent vehicle speed measurement based on the instantaneous vehicle speed. Building off of the first example, in a second example of the vehicle speed recalibration system, a criterion for the detection of at least one of the first impact and the second impact is that a vertical acceleration exceeds a predetermined threshold. Building off of either the first example or the second example, in a third example of the vehicle speed recalibration system, the operation further comprises: update a value of an operational parameter selected from: a wheel size, or a final drive ratio, the subsequent vehicle speed measurement being a function of the additional operational parameter. Building off of any of the first example through the third example, in a fourth example of the vehicle speed recalibration system, the operation further comprises: abort the operation in response to a detection, between the first time and the second time, any of: a change in direction of travel of the vehicle in excess of a predetermined threshold; a longitudinal acceleration of the vehicle in excess of a predetermined threshold; or a braking of the vehicle in excess of a predetermined threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   detecting, for a vehicle in motion, a first impact to a front suspension and a second impact to a rear suspension, to identify a bump;
   deriving, when the bump is identified, an instantaneous vehicle speed based on a first operational parameter of the vehicle;
   calculating a correction factor for a second operational parameter of the vehicle based on the instantaneous vehicle speed; and
   aborting the method in response to detecting, between a time of the first impact and a time of the second impact, any of: a change in direction of travel of the vehicle in excess of a predetermined range; a longitudinal acceleration of the vehicle in excess of a first predetermined threshold; or a braking of the vehicle in excess of a second predetermined threshold,
   wherein one or more criteria for identifying the bump include, between the time of the first impact and the time of the second impact, at least one of: that a direction of travel of the vehicle remains within the predetermined range; that a longitudinal acceleration of the vehicle does not exceed the first predetermined threshold; and that a braking of the vehicle does not exceed the second predetermined threshold.

2. The method of claim 1, wherein the first operational parameter of the vehicle is a wheelbase of the vehicle.

3. The method of claim 1, wherein the second operational parameter of the vehicle is one of: a wheel size, a final drive ratio, and a tire air pressure.

4. The method of claim 1, further comprising:
   correcting a subsequent vehicle speed measurement in accordance with a formula based on the second operational parameter and the correction factor.

5. The method of claim 1, wherein a criterion for detecting at least one of the first impact and the second impact is that a vertical acceleration exceeds a predetermined threshold.

6. The method of claim 1, wherein a criterion for identifying the bump is that an elapsed duration between the first impact and the second impact falls within a predetermined range.

7. The method of claim 6, wherein the predetermined range is a function of a vehicle speed measurement.

8. The method of claim 6, wherein the predetermined range is a function of a wheelbase of the vehicle.

9. A vehicle speed recalibration system for a vehicle having a set of front wheels and a set of rear wheels, comprising:
   a mechanism to detect a first impact in which at least one of the front wheels has traversed a bump;
   a mechanism to detect a second impact in which at least one of the rear wheels has traversed a bump;
   a timer mechanism to establish an elapsed duration between a first time at which the first impact was detected and a second time at which the second impact was detected; and
   one or more processors to execute instructions stored in a non-transitory memory, the instructions causing the one or more processors to perform an operation for vehicle speed recalibration comprising:
   calculate an instantaneous vehicle speed from a wheelbase of the vehicle and the elapsed duration;
   update a subsequent vehicle speed measurement based on the instantaneous vehicle speed; and
   abort the operation for vehicle speed recalibration in response to a detection, between the first time and the second time, of any of: a change in direction of travel of the vehicle in excess of a predetermined threshold; a longitudinal acceleration of the vehicle in excess of a predetermined threshold; or a braking of the vehicle in excess of a predetermined threshold.

10. The vehicle speed recalibration system of claim 9, wherein a criterion for the detection of at least one of the first impact and the second impact is that a vertical acceleration exceeds a predetermined threshold.

11. The vehicle speed recalibration system of claim 9, the operation further comprising:
    update a value of an operational parameter selected from: a wheel size, or a final drive ratio,
    wherein the subsequent vehicle speed measurement is a function of the additional operational parameter.

12. The vehicle speed recalibration system of claim 9, wherein one or more criteria for identifying the bump include at least one of: that a direction of travel of the vehicle remains within a predetermined range between the first time and the second time; that a longitudinal acceleration of the vehicle does not exceed a predetermined threshold between the first time and the second time; and that a braking of the vehicle does not exceed a predetermined threshold between the first time and the second time.

* * * * *